Patented May 2, 1950

2,505,948

UNITED STATES PATENT OFFICE 2,505,948

PYRIDINIUM ESTERS

Melvin De Groote, University City, and Bernhard Keiser, Webster Groves, Mo., assignors to Petrolite Corporation, Ltd., Wilmington, Del., a corporation of Delaware No Drawing. Original application June 15, 1942, Serial No. 447,164. Divided and this application August 2, 1943, Serial No. 497,131

1 Claim. (Cl. 260—295)

This invention relates to a new chemical product or composition of matter, our present application being a division of our co-pending application Serial No. 447,164, filed June 15, 1942, which subsequently matured as United States Patent No. 2,353,707, dated July 18, 1944.

The main object of our invention is to provide a new chemical product or compound that is particularly adapted for use as a demulsifier in the resolution of crude oil emulsions.

Another object of our invention is to provide a practicable method for manufacturing said new chemical product or compound.

Although one of the primary objects of our invention is to provide a new compound or composition of matter that is an efficient demulsifier for crude oil emulsions of the water-in-oil type, the said compound or composition of matter is adapted for use in other arts, as hereinafter indicated. It also may have additional uses in various other fields which have not yet been investigated.

We have discovered that if one oxyalkylates glycerol so as to introduce at least three oxyalkylene radicals for each hydroxyl group, and if the product so obtained is reacted with a polybasic carboxy acid having not over eight carbon atoms, and in such a manner as to yield a fractional ester, due to the presence of at least one free carboxyl radical, one can then esterify said acidic material or intermediate product with at least one mole of an alcoholic compound of the type herein described to give a variety of new compositions of matter which have utility in various arts, and particularly in the demulsification of crude oil.

The compounds herein contemplated may be produced in any suitable manner, but are usually manufactured by following one of two general procedures. In one of said procedures the oxyalkylated glycerol, which is, in essence, a polyhydric alcohol, is reacted with a polybasic acid so as to give an acidic material or intermediate product, which, in turn, is reacted with an alcoholic body of the kind hereinafter described, and momentarily indicated by the formula $R_1(OH)_m$. Generically, the alcoholic body herein contemplated may be considered a member of the class in which $m$ may vary from 1 to 10, although the specific significance of $m$ in the present instance will be hereinafter indicated. The second procedure is to react an alcohol of the formula type $R_1(OH)_m$ with a polybasic acid so as to produce an intermediate product, and then react said intermediate product or fractional ester with the selected oxyalkylated glycerol.

Glycerol may be conveniently indicated by the following formula:

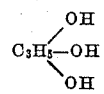

If treated with an oxyalkylating agent, and momentarily consideration will be limited to an oxyethylating agent, one may obtain an oxyethylated glycerol of the following formula:

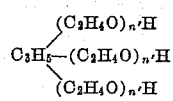

in which the value of $n'$ may vary from 3 to 10 and all the values of $n'$ need not be identical. If a polybasic carboxy acid be indicated by the formula:

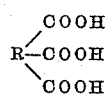

then the acyclic reaction product of one mole of oxyethylated glycerol and one mole of a polybasic carboxy acid may be indicated by the following formula:

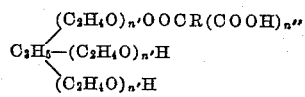

in which $n''$ has the value of one or two. Similarly, if two moles of the polybasic acid be used, then the compound may be indicated by the following formula:

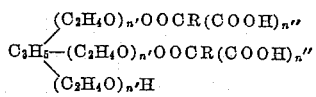

Likewise, if three moles of a polybasic acid are employed, the compound may be indicated by the following formula:

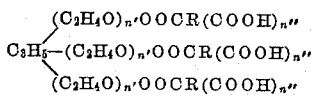

If a fractional ester of the kind exemplified by the three preceding formulas is reacted with one or more moles of an alcohol of the kind previously described in a generic sense as $R_1(OH)_m$, then obviously, one may obtain a material of the type indicated by the following formula:

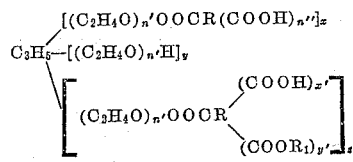

in which $x$ is 0, 1 or 2, $y$ is 0, 1 or 2, and $z$ is 1, 2 or 3, and $x'$ is 0 or 1, and $y'$ is 1 or 2.

It has been previously stated that compounds of the type herein contemplated may be obtained by oxyalkylating agents, without being limited to ethylene oxide. Suitable oxyalkylating agents include ethylene oxide, propylene oxide, butylene oxide and glycid, which, although not included, strictly speaking, by the unitary structure $C_nH_{2n}O$, is included within the meaning of the hereto appended claims and may be simply considered as a variant of propylene oxide, i. e., hydroxypropylene oxide. Similarly, where a carboxylic hydrogen atom appears, it may be replaced by metal, an ammonium radical, or substituted ammonium radical, or by an organic group derived from an alcohol, such as an aliphatic alcohol, an aralkyl alcohol, or an alicyclic alcohol. It may also be converted into an amide, including a polyaminoamide. Thus, the preceding formula may be rewritten in its broader scope, as follows:

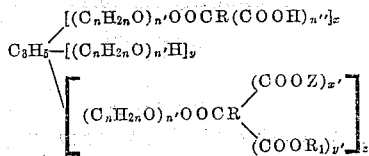

in which $n$ replaces the numbers 2, 3 or 4, Z includes the acidic hydrogen atom itself. In the above formula, and hereafter for convenience, $R_1$ is intended to include any hydroxyl groups that remain.

If the compounds herein contemplated are obtained under usual conditions, at the lowest temperatures, then the monomeric form is most likely to result.

The production of the compounds herein contemplated is the result of one or more esterification steps. As is well known, esterification procedures can be carried out in various manners, but generally speaking, esterifications can be carried out at the lowest feasible temperatures by using one or several procedures. One procedure is to pass an inert dried gas through the mass to be esterified, and have present at the same time a small amount of a catalyst, such as dried HCl gas, a dried sulfonic acid, or the like. Another and better procedure, in many instances, is to employ the vapors of a suitable liquid, so as to remove any water formed and condense both the vapors of the liquid employed and the water in such a manner as to trap out the water and return the liquid to the reacting vessel. This procedure is commonly employed in the arts, and for convenience, reference is made to U. S. Patent No. 2,264,759, dated December 2, 1941, to Paul C. Jones.

Referring again to the last two formulas indicating the compounds under consideration, it can be readily understood that such compounds, in numerous instances, have the property of polyfunctionality. In view of this fact, where there is at least one residual carboxyl and at least one residual hydroxyl, one would expect that under suitable conditions, instead of obtaining the monomeric compounds indicated, one would, in reality, obtain a polymer in the sense, for example, that polyethylene glycols represent a polymer of ethylene glycol. The term "polymer" is frequently used to indicate the polymerized product derived from a monomer in which the polymer has the same identical composition as the monomer. In the present instance, however, polymerization involves the splitting and loss of water so that the process is essentially self-esterification. Thus, strictly speaking, the polymeric compounds are not absolutely isomers of the monomeric compounds, but since, for all practical purposes, they can be so indicated, and since such practice is common in the arts concerned with materials of this type, it is so adapted here. Thus, reference in the appended claims to polymers is intended to include the self-esterification products of the monomeric compounds.

In view of what has been said, and in view of the recognized hydrophile properties of the recurring oxyalkylene linkages, particularly the oxyethylene linkage, it is apparent that the materials herein contemplated may vary from compounds which are clearly water-soluble through self-emulsifying oils, to materials which are balsam-like and sub-resinous or semi-resinous in nature. The compounds may vary from monomers to polymers, in which the unitary structure appears a number of times, for instance, 10 or 12 times. It is to be noted that true resins, i. e., truly insoluble materials of a hard plastic nature, are not herein included. In other words, the polymerized compounds are soluble to a fairly definite extent, for instance, at least 5% in some solvents, such as water, alcohol, benzene, dichloroethyl ether, acetone, cresylic acid, acetic acid, ethyl acetate, dioxane, or the like. This is simply another way of stating that the polymerized product contemplated must be of the sub-resinous type, which is commonly referred to as an A resin, or a B resin, as distinguished from a C resin, which is a highly infusible, insoluble resin (see Ellis, Chemistry of Synthetic Resins (1935), pages 862, et seq.).

Reviewing the form as presented, it is obvious that one may obtain compounds within the scope disclosed, which contain neither a free hydroxyl nor a free carboxyl group, and one may also obtain a compound of the type in which there is present at least one free carboxyl, or at least, one free hydroxyl, or both. The word "polar" has sometimes been used in the arts in this particular sense to indicate the presence of at least one free hydroxyl group, or at least, one free carboxyl group, or both. In the case of the free carboxyl group, the carboxylic hydrogen atom may, of course, be replaced by any ionizable hydrogen atom equivalent, such, for example, as a metal, an ammonium radical, a substituted ammonium radical, etc. In the hereto appended claims the word "polar" is used in this specific sense.

We are aware that compounds similar to those contemplated in the present instance may be derived from polyhydroxylated compounds having more than three hydroxyl groups. For instance, they may be derived from acyclic diglycerol, triglycerol, tetraglycerol, mixed polyglycerols, mannitol, sorbitol, various hexitols, dulcitol, pentaerythritol, sorbitan, mannitan, dipentaerythritol monoether, and other similar compounds. Such particular types in which higher hydroxylated materials are subjected to oxyalkylation and then employed in the same manner as oxyalkylated glycerol, is employed in the present instance, are not contemplated in this specific case, although attention is directed to the same.

Reference is also made to other oxyalkylated compounds which may be used as reactants to replace oxyalkylated glycerol, or oxyalkylated ethylene glycol, which latter reactant is described in an application hereinafter referred to. The reactants thus contemplated include the type in which there is an amino or amido nitrogen atom. Particularly, when present in a low molal type of compound prior to oxyalkylation, reference being made to polyhydroxylated materials, including those having two or three hydroxyl groups, as well as those having more than three hydroxyl groups. For instance, the oxyalkylated derivatives, particularly the oxyethylated derivatives of ethyldiethanolamine, bis(hydroxyethyl)-acetamide, the acetamide of tris(hydroxymethyl)-aminomethane, tetrahydroxylated ethylene diamine, etc. Compounds may also be derived from cyclic diglycerol and the like.

Furthermore, for convenience, attention is directed to a somewhat similar class of materials which are described in our application Serial No. 401,380, filed July 7, 1941, now Patent 2,324,492, July 20, 1943. Said application involves the use of the same type of alcoholic bodies, for reactants, but is limited, among other things, to the compounds which are essentially symmetrical in nature, for instance, involving the introduction of two alcoholic residues, whereas, in the present instance, one, two, or three, or more, might be introduced.

As indicated previously, the polybasic acids employed are limited to the type having not more than 8 carbon atoms, for example, oxalic, malonic, succinic, glutaric, adipic, maleic, and phthalic. Similarly, one may employ acids such as fumaric, glutaconic, and various others, such as citric, malic, tartaric, and the like. The selection of the particular tribasic or dibasic acid employed, is usually concerned largely with the convenience of manufacture of the finished ester, and also the price of the reactants. Generally speaking, phthalic acid or anhydride tends to produce resinous materials, and greater care must be employed if the ultimate or final product be of a sub-resinous type. Specifically, the preferred type of polybasic acid is such as to contain six carbon atoms or less. Generally speaking, the higher the temperature employed, the easier it is to obtain large yields of esterified product, although polymerization may be stimulated. Oxalic acid may be comparatively cheap, but it decomposes readily at slightly above the boiling point of water. For this reason it is more desirable to use an acid which is more resistant to pyrolysis. Similarly, when a polybasic acid is available in the form of an anhydride, such anhydride is apt to produce the ester with greater ease than the acid itself. For this reason, maleic anhydride is particularly adaptable, and also, everything else considered, the cost is comparatively low on a per molar basis, even though somewhat higher on a per pound basis. Succinic acid or the anhydride has many attractive qualities of maleic anhydride, and this is also true of adipic acid. For purposes of brevity, the bulk of the examples, hereinafter illustrated, will refer to the use of maleic anhydride, although it is understood that any other suitable polybasic acid may be employed. Furthermore, reference is made to derivatives obtained by oxyethylation, although, as previously pointed out, other oxyalkylating agents may be employed.

As far as the range of oxyethylated glycerols employed as reactants is concerned, it is our preference to employ those in which approximately 15 to 24 oxyethylene groups have been introduced into a single glycerol molecule. This means that approximately five to eight oxyethylene radicals have been introduced for each original hydroxyl group.

The oxyalkylation of glycerol is a well known procedure (see Example 11 of German Patent No. 605,973, dated November 22, 1934, to I. G. Farbenindustrie A. G.). The procedure indicated in the following three examples is substantially identical with that outlined in said aforementioned German patent.

OXYETHYLATED GLYCEROL

Example 1

184 pounds of glycerol is mixed with ½%, by weight, of caustic soda solution having a specific gravity of 1.383. The caustic soda acts as a catalyst. The ethylene oxide is added in relatively small amounts, for instance, about 44 pounds at a time. The temperature employed is from 150–180° C. Generally speaking, the gauge pressure during the operation approximates 200 pounds at the maximum, and when reaction is complete, drops to zero, due to complete absorption of the ethylene oxide. When all the ethylene oxide has been absorbed and the reactants cooled, a second small portion, for instance, 44 more pounds of ethylene oxide, are added and the procedure repeated until the desired ratio of 15 pound moles of ethylene oxide to one pound mole of glycerol is obtained. This represents 660 pounds of ethylene oxide for 92 pounds of glycerol. Such product has the following composition:

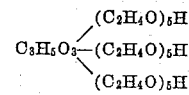

OXYETHYLATED GLYCEROL

Example 2

The ratio of ethylene oxide is increased to 18 pound moles for each pound mole of glycerol. Otherwise, the same procedure is followed as in Example 1, preceding.

OXYETHYLATED GLYCEROL

Example 3

The same procedure is followed as in the two previous examples, except that the ratio of ethylene oxide to glycerol is increased to 21 to 1.

OXYETHYLATED GLYCEROL MALEATE

Example 1

One pound mole of oxyethylated glycerol (1 to 15 ratio) prepared in the manner previously described is treated with one pound mole of maleic anhydride and heated at approximately 110° C. for approximately 30 minutes to 2 hours, with constant stirring, so as to yield a monomaleate.

OXYETHYLATED GLYCEROL MALEATE

Example 2

The same procedure is followed as in the preceding example, except that two moles of maleic anhydride are employed so as to obtain the dimaleate instead of the monomaleate. The composition of the product may be indicated by the following formula:

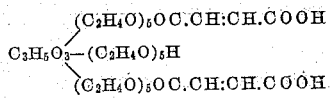

OXYETHYLATED GLYCEROL MALEATE

Example 3

The same procedure is followed as in the two preceding examples, except that three moles of maleic anhydride are employed so as to obtain the trimaleate.

OXYETHYLATED GLYCEROL MALEATE

Example 4

The same procedure is employed as in the preceding examples, except that oxyethylated glycerol (ratio 1 to 18) is substituted in place of oxyethylated glycerol (ratio 1 to 15).

OXYETHYLATED GLYCEROL MALEATE

Example 5

The same procedure is employed as in the preceding examples, except that oxyethylated glycerol (ratio 1 to 21) is employed instead of oxyethylated glycerol (ratio 1 to 15) or (1 to 18).

Previous reference has been made to an alcoholic body which has been defined generically by the formula $R_1(OH)_m$. The sub-generic class of alcoholic compounds employed as reactants in the manufacture of the present compounds, are hydroxylated substituted pyridinium halides or other compounds in which there is present an anion functionally equivalent to the halide anion, i. e., an anionic functional equivalent to the chloride or bromide ion. When pyridine combines with a hydrohalide, such as HCl, the compound formed may be indicated either as

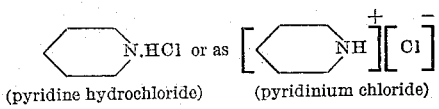

(pyridine hydrochloride)   (pyridinium chloride)

Compare with ammonium chloride. Note that as in ammonium chloride, the nitrogen atom has 4 covalences, and the fifth valence is electrovalent.

In such instances where the covalent hydrogen atom has been replaced by an organic radical, for instance, an alkyl radical, the compound is then referred to as an N-alkylpyridinium halide, or more briefly, simply as an alkylpyridinium halide. (See Organic Chemistry, Hill and Kelley, p. 790; or Organic Chemistry, Caldwell, p. 655.) Such compound may be illustrated, thus:

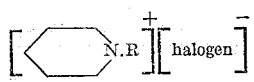

More specifically, then, in the compounds herein intended as reactants, the radical R of the substituted pyridinium radical, as differentiated from the unsubstituted pyridinium radical, wherein R is replaced by a hydrogen atom, must contain an alcoholic hydroxyl radical.

Thus, there is a large variety of such compounds available, and they are characterized by the fact that the group R substituted for the hydrogen atom of the pyridinium radical.

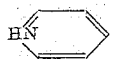

contains in excess of 7 carbon atoms and contains at least one alcoholic hydroxyl radical. When such quaternary compound is prepared, for example, from triricinolein, so that a triricinolein radical contributes the major part of the carbon atoms of R, the group or radical represented by R, or the group or radical substituted for the hydrogen atom of the pyridinium radical, may contain as many as 59 carbon atoms, of which 57 were contributed by the triricinolein residue. This is illustrated by a subsequent example and formula. Generally speaking, the range of 10–30 carbon atoms represents the most desirable type of reactant to be employed. The hydroxyl radical may be present as part of a hydroxy hydrocarbon radical, or it may be present as the part of an acyl radical. For instance, it may be present as part of a ricinoleyl radical, or similar radical, derived from hydroxystearic acid or the like.

In order to illustrate suitable quaternary reactants of the type above described, reference is made to the following examples. It is to be noted that this list is by no means exhaustive.

INTERMEDIATE REACTANT

Example 1

500 g. of a fatty acid ethanolamide, obtained by reaction of split cocoanut oil (containing all the natural acids, beginning with the caprylic up to the stearic acid, and some oleic acid) with monoethanolamine, 330 g. hydrochloride of a fraction of pyridine bases (50% distilling up to 140° C., 90% distilling up to 160°, completely soluble in water) and 100 g. of the mixture of the free pyridine bases, are heated at 100° C. until the product is, for the most part, soluble in water and stable towards diluted sodium carbonate solution. After being separated from the primary compounds not reacted upon, the mixture of pyridinium-, picolinium- and other homologous pyridinium compounds obtained, may be further worked up to form a 10% watery solution.

When working at 150–160°, the reaction is more rapid.

Furthermore, pure pyridine may be used instead of a mixture of pyridine bases.

The reaction may be indicated in the following manner:

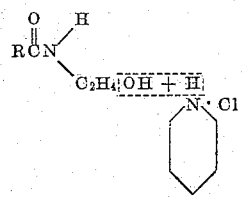

INTERMEDIATE REACTANT

Example 2

Hydroxyethyl ricinoleoamide derived by reaction between ricinoleic acid and monoethanolamine is substituted for the amide employed in Example 2, preceding.

INTERMEDIATE REACTANT

Example 3

A drastically-oxidized castor oil having approximately the following characteristics:

| | |
|---|---|
| Acid number | 13.2 to 25.0 |
| Saponification number | 230.5 to 274.0 |
| Iodine number | 43.5 to 55.0 |
| Acetyl number | 164.0 to 192.0 |
| Hydroxyl value | 188.0 to 220.0 |
| Percent unsaponifiable matter | 1.1 |
| Percent nitrogen | 0.0 |
| Percent $SO_3$ | 0.0 |
| Percent ash | Trace | is converted into the hydroxyethyl amide by reaction with monoethanolamine. Such amide is substituted for the amide employed in Example 1, preceding.

INTERMEDIATE REACTANT

*Example 4*

One pound mole of castor oil is treated with three pound moles of ethylene oxide at a temperature of 100–200° C. at a gauge pressure of 100 pounds and less than 300 pounds, so as to produce an oxyethylated triricinolein. Such oxyethylated triricinolein is converted into the hydroxyethyl amide in the manner described in Example 3, immediately preceding. Such amide is employed instead of the amide described in Example 1, preceding.

INTERMEDIATE REACTANT

*Example 5*

Phenylstearic acid is prepared in any suitable manner. This is converted into phenylstearic hydroxy ethyl amide, and such amide employed in the manner described in Example 1, preceding.

The manufacture of the above compounds is usually conducted with an excess of the pyridinium base halide, such as the hydrochloride or hydrobromide, and usually in the presence of a significant amount of the free pyridinium base itself. In many instances, however, there is no need to use an excess of the pyridinium base halide, and in fact, no need to have present any of the free pyridinium base itself, or at the most, only a trace of the free base.

INTERMEDIATE REACTANT

*Example 6*

24 parts of chloracetyl chloride were added slowly to 90 parts of castor oil, while stirring. After the first vigorous reaction had subsided, the mixture was placed under a reflux condenser and was stirred and heated on a steam plate for 6 hours. The evolved HCl gas was then swept out with dry air. Then 16 parts of pyridine were added to the mixture, which was thereupon warmed while stirring for a period of four hours. The product was a red, viscous oil which was nearly solid at room temperature. In water it formed a clear, viscous solution of low surface tension. The product was not precipitated from solution by alkali, alkaline earth-, or heavy metal salts. The compound derived may be indicated in the following manner:

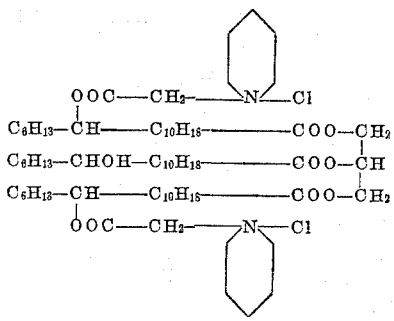

INTERMEDIATE REACTANT

*Example 7*

12 parts of chloracetyl chloride were added with stirring to 90 parts of castor oil. The mixture was warmed on the steam plate for 14 hours, purged of HCl with dry air, and then mixed with 8 parts of pyridine. This mixture was left on the steam plate over night. The product was a dark red oil, dispersible in water, and soluble in xylene. At least a predominant portion of this material consisted of a quaternary ammonium salt having the formula:

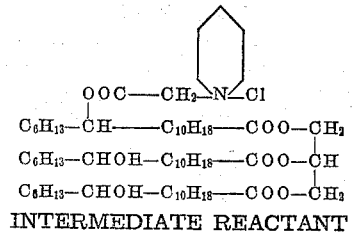

INTERMEDIATE REACTANT

*Example 8*

Bis(hydroxyethyl)ricinoleoamide is substituted for castor oil in the preceding example so as to give a suitable monopyridinium derivative.

INTERMEDIATE REACTANT

*Example 9*

Monoricinolein is substituted for castor oil in Intermediate reactant, Example 7, preceding, so as to yield the monopyridinium derivative.

INTERMEDIATE REACTANT

*Example 10*

Diricinolein is substituted for monoricinolein in the preceding example.

INTERMEDIATE REACTANT

*Example 11*

The ricinoleoamide derived from tris(hydroxymethyl)aminomethane is substituted for bis(hydroxyethyl)ricinoleoamide in Intermediate reactant, Example 8, preceding. The reaction may be indicated, thus:

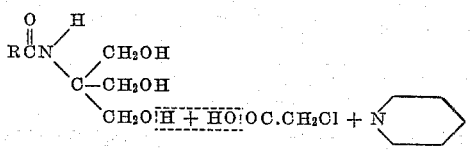

INTERMEDIATE REACTANT

*Example 12*

The neutral ester derived by esterifying one part of diethylene glycol with 2 parts of ricinoleic acid, is substituted for castor oil in Intermediate reactant, Example 7, preceding, so as to yield the monopyridinium derivative.

INTERMEDIATE REACTANT

*Example 13*

Mannitan monooleate is substituted for castor oil in Intermediate reactant, Example 7, so as to obtain the monopyridinium derivative.

INTERMEDIATE REACTANT

*Example 14*

Ricinoleic acid or an ester thereof such as ethyl ricinoleate is reduced to give the corresponding diol, i. e., a dihydroxy octadecane. Such diol is substituted for castor oil in Intermediate reactant, Example 7, preceding, so as to obtain the corresponding monopyridinium derivative. Similarly, instead of dihydroxy octadecane, dihydroxy octane, dihydroxy decane, or dihydroxy tetradecane may be employed. The reaction may be indicated, thus:

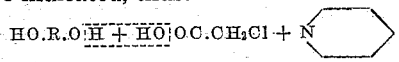

INTERMEDIATE REACTANT

*Example 15*

Phenol is reacted with acetone (or diethyl ketone or methyl ethyl ketone), as described in U. S. Patent No. 1,225,748, to Wallace A. Beatty, to give the compound diphenylol methane,

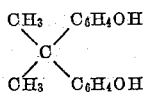

(or the corresponding diethyl or methyl ethyl compound). This compound is hydrogenated as described in British Patent No. 274,439, to give the corresponding dicyclohexylol dialkyl methane. The product so obtained may be conveniently considered as a diol and substituted in place of the diol used as a reactant in Intermediate reactant, Example 14, preceding.

Compare Intermediate reactant, Examples 8–15, inclusive, with Intermediate reactant, Examples 6 and 7. Note also that a somewhat similar reactant, which may be employed in the manufacture of Intermediates by the same procedure, is obtained by reacting two moles of ricinoleic acid with one mole of ethylene diamine, or one mole of ricinoleic acid with one mole of hydroxyethyl ethylene diamine to give an amide.

INTERMEDIATE REACTANT

*Example 16*

The procedure described in Example 7, preceding, is followed, except that sufficient chloracetyl chloride, and likewise, sufficient pyridine, is employed so that a dipyridinium compound is obtained. Thus, this is, in essence, a repetition of Intermediate reactant, Example 6, preceding, which is illustrated by formula.

INTERMEDIATE REACTANT

*Example 17*

12 parts of ricinoleo-hydroxymethylamide, 8 parts of anhydrous pyridine hydrochloride, and 20 parts of pyridine are stirred together at 70–80° C. until a test sample of the reaction mixture dissolves in water to give clear solutions. The reaction mixture is then distilled at 60–70° C. under reduced pressure to remove pyridine. Acetone is then added to the distillation residue, which is a viscous mass, whereby the new quaternary salt is precipitated in the form of white needles. The new quaternary salt, ricinoleo-methyl pyridinium chloride, thus obtained when purified, if necessary, by recrystallization from acetone, gives analyses corresponding to the formula

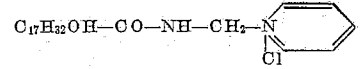

The new quaternary salt is readily soluble in warm water to give clear foaming solutions.

INTERMEDIATE REACTANT

*Example 18*

Compounds of the following type formula are known:

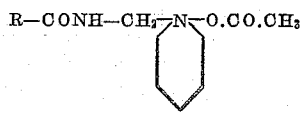

Obviously, a compound of the above type or a suitable variant thereof may have present an alcohol hydroxyl group. For instance, R may be derived from ricinoleic acid. Such compound may be treated with ethylene oxide so as to convert the amino hydrogen atom into a hydroxyethyl group.

INTERMEDIATE REACTANT

*Example 19*

Compounds of the following type are known:

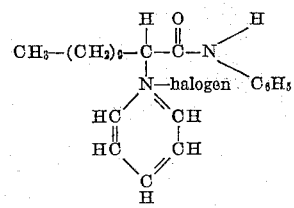

The same sort of procedure enumerated in the preceding example may be used to assure the presence of an alcoholic hydroxyl group. This means that, instead of being derived from lauric acid or its equivalent, the compound would be obtained from a hydroxylated acid, such as ricinoleic, as in the example immediately preceding.

INTERMEDIATE REACTANT

*Example 20*

Compounds are obtained comparable to those described in Examples 1–5, inclusive, by use of diethanolamine, instead of monoethanolamine for the production of amide or by oxyethylation or oxyalkylation of the completed product derived from monoethanolamine, whereby an amino hydrogen atom is converted into a hydroxyethyl group. Such reaction may be indicated in the following manner:

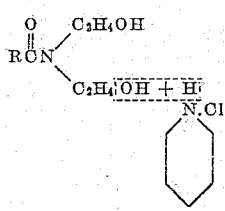

INTERMEDIATE REACTANT

*Example 21*

An esterified hydroxy tertiaryamine, such as ethyl diethanolamine or triethanolamine, as exemplified by the following formula:

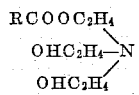

in which RCO is a fatty acid radical, such as the oleic acid radical or ricinoleic acid radical, is substituted for the hydroxylated amide in the type of material exemplified by Examples 1–5, preceding. This may be illustrated in the following manner:

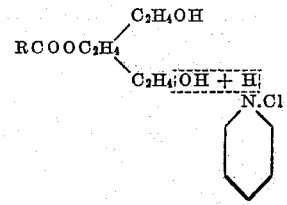

INTERMEDIATE REACTANT

Example 22

An esterified polyamine of the following formula type:

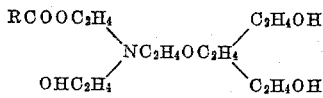

is substituted for the somewhat analogous monoamino reactant of the preceding example.

INTERMEDIATE REACTANT

Example 23

As to other substituted pyridinium type compounds which may serve as reactants in the manufacture of the compounds of the kind herein contemplated, reference is made to the following: U. S. Patents Nos. 2,189,397, dated Feb. 6, 1940, to Harris; 2,189,664, Feb. 6, 1940, to Katzman; 2,190,133, Feb. 13, 1940, to Epstein et al.; 2,213,979, Sept. 10, 1940, to Epstein et al., and 2,217,683, Oct. 15, 1940, to Katzman.

INTERMEDIATE REACTANT

Example 24

A high molal amine, for instance, the amine derived by converting oleic acid, stearic acid, ricinoleic acid, lauric acid, and the like, into the corresponding amide, and then reducing to the nitrile and then further reducing to the amine, is treated with an oxyalkylating agent, such as ethylene oxide, to give a product such as hydroxyethyl dodecylamine, or bis(hydroxyethyl) dodecylamine. Such products are then treated with pyridinium hydrochloride or the equivalent in the manner contemplated in Intermediate reactant, Examples 1–5, preceding, so as to yield a hydroxylated compound.

INTERMEDIATE REACTANT

Example 25

The ricinoleic acid amide derived by reaction between ricinoleic acid and tris(hydroxymethyl)aminomethane is reacted with pyridine hydrochloride in the manner illustrated by Intermediate reactant, Examples 1–5, preceding. The reaction may be illustrated, thus:

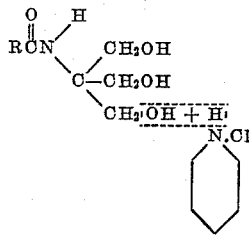

INTERMEDIATE REACTANT

Example 26

2-amino-2-methyl-1-propanol is reacted with ricinoleic acid and the amide so obtained reacted with pyridine hydrochloride in the manner exemplified by Intermediate reactant, Examples 1–5, preceding. The reaction may be indicated, thus:

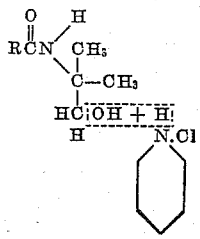

Similar reactants include the following: 2-amino-1-butanol; 2-amino-2-methyl-1,3-propane diol; 2-amino-2-ethyl-1,3-propane diol; 1-3-diamino propanol. Such materials may not only be combined with ricinoleic acid; but in such instances where there is more than one available hydroxyl radical after completion of the intermediate, one may use oleic or naphthenic acid or the like to introduce a high molal acyl group. It is to be noted that some of the pyridinium compounds above described as reactants represent new compositions or compounds. Similarly, analogous materials so derived that there is no residual alcoholic hydroxyl, also represent new types of materials.

COMPLETED MONOMERIC DERIVATIVE

Example 1

One pound mole of a product of the kind described under the heading "Oxyethylated glycerol maleate, Example 1" is reacted with one pound mole of "Intermediate reactant, Example 6," preferably in the absence of any high boiling hydrocarbon or inert solvent. However, if an inert vaporizing solvent is employed, it is generally necessary to use one which has a higher boiling range than xylene, and sometimes removal of such solvent might present a difficulty. In other instances, however, such high boiling inert vaporizing solvent, if employed, might be permitted to remain in the reacted mass and appear as a constituent or ingredient of the final product. In any event, our preference is to conduct the reaction in the absence of any such solvent and permit the reaction to proceed with the elimination of water. The temperature of reaction is about 180 to 200° C. and time of reaction about 20 hours.

COMPLETED MONOMERIC DERIVATIVE

Example 2

The same procedure is followed as in Completed monomeric derivative, Example 1, preceding, except that the dimaleate described under the heading "Oxyethylated glycerol maleate, Example 2" is used instead of the monomaleate. The reaction may be shown as follows:

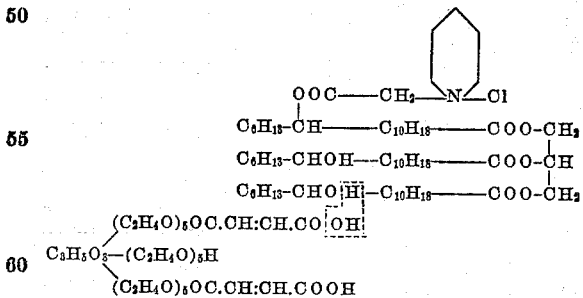

COMPLETED MONOMERIC DERIVATIVE

Example 3

The same procedure is followed as in the two preceding examples, except that the trimaleate is substituted for the monomaleate or dimaleate in the two preceding examples.

COMPLETED MONOMERIC DERIVATIVE

Example 4

The same procedure is followed as in Examples 2 and 3, immediately preceding, except that for each pound mole of the maleate, or each pound mole of the trimaleate, instead of using one pound mole of Intermediate reactant, Example 6, as a reactant, one employs two pound moles.

COMPLETED MONOMERIC DERIVATIVE

Example 5

The same procedure is followed as in Example 3, preceding, except that for each pound mole of trimaleate, instead of adding one pound mole of Intermediate reactant, Example 6, one adds three pound moles of Intermediate reactant, Example 6, for reaction.

COMPLETED MONOMERIC DERIVATIVE

Example 6

Reference to the preceding examples will show that in each and every instance oxyethylated glycerol (ratio 1 to 15) has been employed as a raw material or primary reactant. In the present instance, a more highly oxyethylated glycerol is employed, to wit, one involving the ratio of 1 to 18 (see Oxyethylated glycerol maleate, Example 4, preceding).

COMPLETED MONOMERIC DERIVATIVE

Example 7

The same procedure is followed as in Example 6, immediately preceding, except that the oxyethylated glycerol employed represents one having an even higher degree of oxyethylation. For example, one indicated by the ratio of 1 to 21 (see Oxyethylated glycerol maleate, Example 5, preceding).

COMPLETED MONOMERIC DERIVATIVE

Example 8

The same procedure is followed as in Examples 1 to 7, preceding, except that "Intermediate reactant, Example 7" is substituted for "Intermediate reactant, Example 6."

COMPLETED MONOMERIC DERIVATIVE

Example 9

The same procedure is followed as in Examples 1 to 7, preceding, except that the alcoholic body is the compound derived by reaction between pyridine hydrochloride and bis (hydroxyethyl) ricinoleoamide obtained in turn by reacting ricinoleic acid with diethanolamine.

COMPLETED MONOMERIC DERIVATIVE

Example 10

The same procedure is followed as in Examples 1 to 7, preceding, except that instead of employing "Intermediate reactant, Example 6," one employs instead the compound obtained by reaction between pyridine hydrochloride and the ricinoleoamide of tris (hydroxymethyl) aminomethane.

The method of producing such fractional esters is well known. The general procedure is to employ a temperature above the boiling point of water and below the pyrolytic point of the reactants. The products are mixed and stirred constantly during the heating and esterification step. If desired, an inert gas, such as dried nitrogen or dried carbon dioxide, may be passed through the mixture. Sometimes it is desirable to add an esterification catalyst, such as sulfuric acid, benzene sulfonic acid, or the like. This is the same general procedure as employed in the manufacture of ethylene glycol dihydrogen diphthalate.

Sometimes esterification is conducted most readily in the presence of an inert solvent, that carries away the water of esterification which may be formed, although as is readily appreciated, such water of esterification is absent when such type of reaction involves an acid anhydride, such as maleic anhydride, and a glycol. However, if water is formed, for instance, when citric acid is employed, then a solvent such as xylene may be present and employed to carry off the water formed. The mixture of xylene vapors and water vapors can be condensed so that the water is separated. The xylene is then returned to the reaction vessel for further circulation. This is a conventional and well known procedure and requires no further elaboration.

In the previous monomeric examples there is a definite tendency, in spite of precautions, at least in a number of instances, to obtain polymeric materials and certain cogeneric by-products. This is typical, of course, of organic reactions of this kind, and as is well known, organic reactions per se are characterized by the fact that 100% yields are the exception, rather than the rule, and that significant yields are satisfactory, especially in those instances where the by-products or cogeners may satisfactorily serve with the same purpose as the principal or intentional product. This is true in the present instance. In many cases when the compound is manufactured for purposes of demulsification, one is better off to obtain a poylmer in the sense previously described, particularly a polymer whose molecular weight is a rather small multiple of the molecular weight of the monomer, for instance, a polymer whose molecular weight is two, three, four, five, or six times the molecular weight of the monomer. Polymerization is hastened by the presence of an alkali, and thus, in instances where it is necessary to have a maximum yield of the monomer, it may be necessary to take such precautions that the alkali used in promoting oxyethylation of glycerol, be removed before subsequent reaction. This, of course, can be done in any simple manner by conversion to sodium chloride, sodium sulfate, or any suitable procedure.

In the preceding examples of the Completed monomeric derivative, Examples 1 to 10, inclusive, no reference is made to the elimination of such alkaline catalyst, in view of the effectiveness of the low multiple polymers as demulsifiers. Previous reference has been made to the fact that the carboxylic hydrogen atom might be variously replaced by substituents, including organic radicals, for instance, the radicals obtained from alcohols, hydroxylated amines, non-hydroxylated amines, polyhydric alcohols, etc. Obviously, the reverse is also true, in that a free hydroxyl group may be esterified with a selected acid, varying from such materials as ricinoleic acid to oleic acid, including alcohol acids, such as hydroxyacetic acid, lactic acid, ricinoleic acid and also polybasic acids of the kind herein contemplated.

With the above facts in mind, it becomes obvious that what has been previously said as to polymerization, with the suggestion that byproducts or cogeneric materials were formed, may be recapitulated with greater definiteness, and one can readily appreciate that the formation of heat-rearranged derivatives or compounds must take place to a greater or lesser degree. Thus, the products herein contemplated may be characterized by being monomers of the type previously described, or esterification polymers, or the heat-rearranged derivatives of the same, and thus including the heat-rearranged derivatives of both the polymers and the esterification monomers, separately and jointly. Although the class of materials specifically contemplated in this instance is a comparatively small and narrow class of a broad genus, yet it is obviously impossible to present any adequate formula which would contemplate the present series in their complete ramification, except in a manner employed in the hereto appended claims.

Although the products herein contemplated vary so broadly in their characteristics, i. e., monomers through sub-resinous polymers, soluble products, water-emulsifiable oils or compounds, hydrotropic materials, balsams, sub-resinous materials, semi-resinous materials, and the like, yet there is always present the characteristic unitary hydrophile structure related back to the oxyalkylation, particularly the oxyethylation of the glycerol used as the raw material. When our new product is used as a demulsifier in the resolution of oil field emulsions, the demulsifier may be added to the emulsion at the ratio of 1 part in 10,000, 1 part in 20,000, 1 part in 30,000, or for that matter, 1 part in 40,000. In such ratios it well may be that one cannot differentiate between the solubility of a compound completely soluble in water in any ratio, and a semi-resinous product apparently insoluble in water in ratios by which ordinary insoluble materials are characterized. However, at such ratios the importance must reside in interfacial position and the ability to usurp, preempt, or replace the interfacial position previously occupied perhaps by the emulsifying colloid. In any event, reviewed in this light, the obvious common property running through the entire series, notwithstanding variation in molecular size and physical make-up, is absolutely apparent. Such statement is an obvious oversimplification of the rationale underlying demulsification, and does not even consider the resistance of an interfacial film to crumbling, displacement, being forced into solution, altered wetability, and the like. As to amidification polymers, for instance, where Z is a polyaminoamide radical, see what is said subsequently.

COMPLETED POLYMERIC DERIVATIVES INCLUDING HEAT-REARRANGED COGENERS

*Example 1*

One selects a polyfunctional monomer of one of the types described under the heading "Completed monomeric derivatives, Examples 1 to 7," and heats the same at a temperature of 220–240° C., with constant stirring, for a period of 2 to 60 hours, so as to eliminate sufficient water, in order to insure that the resultant product has a molecular weight approximately twice that of the initial monomer.

COMPLETED POLYMERIC DERIVATIVES INCLUDING HEAT-REARRANGED COGENERS

*Example 2*

The same procedure is followed as in the preceding example, except that polymerization is continued, using either a somewhat longer reaction time, or it may be, a somewhat higher temperature, or both, so as to obtain a material having a molecular weight of approximately three to four times that of the initial product.

COMPLETED POLYMERIC DERIVATIVES INCLUDING HEAT-REARRANGED COGENERS

*Example 3*

The same procedure is followed as in Examples 1 and 2, preceding, except that one selects the polyfunctional monomer from one of the materials described under the headings "Completed monomeric derivative, Examples 8 to 10."

COMPLETED POLYMERIC DERIVATIVES INCLUDING HEAT-REARRANGED COGENERS

*Example 4*

The same procedure is followed as in Examples 1 to 3, preceding, except that one polymerizes a mixture instead of a single monomer, for instance, a mixture of materials of the kind described in Completed monomeric derivative, Example 3, and in Completed monomeric derivative, Example 4, are mixed in molecular proportion and subjected to polymerization in the manner indicated in the previous examples.

It is understood, of course, that the polymerized product need not be obtained as a result of a two-step procedure. In other words, one need not convert the reactants into the monomer and then subsequently convert the monomer into the polymer. The reactants may be converted through the monomer to the polymer in one step. Indeed, the formation of the monomer and polymerization may take place simultaneously. This is especially true if polymerization is conducted in the absence of a liquid such as xylene, as previously described, and if one uses a comparatively higher temperature, for instance, approximately 220° C. for polymerization. Thus, one pound mole of an oxyethylated glycerol polymaleate of the kind described is mixed with one pound mole of a product of the kind described under the heading "Intermediate reactant, Example 7," and reacted for 20 hours at approximately 220° C., until the mass is homogeneous. It is stirred constantly during reaction. Polyfunctionality may reside in dehydration (etherization) of two hydroxyl groups attached to dissimilar molecules.

The fact that the polymerized and heat-rearranged products can be made in a single step, illustrates a phenomenon which sometimes occurs either in such instances where alcoholic bodies of the kind herein illustrated are contemplated as reactants, or where somewhat kindred alcoholic bodies are employed. The reactants may be mixed mechanically to give a homogeneous mixture, or if the reactants do not mix to give a homogeneous mixture, then early in the reaction stage there is formed, to a greater or lesser degree, sufficient monomeric materials so that a homogeneous system is present. Subsequently, as reaction continues, the system may become heterogeneous and exist in two distinct phases, one being possibly an oily body of moderate viscosity and the other being a heavier material, which is sticky or sub-resinous in nature. In many instances, it will be found that the thinner liquid material is a monomer and the more viscous or resinous material is a polymer, as previously described. Such product can be used for demulsification by adding a solvent which will mutually dissolve the two materials, or else, by separating the two heterogeneous phases and employing each as if it were a separate product of reaction.

Materials of the kind herein contemplated may find uses as wetting, detergent, and leveling agents in the laundry, textile, and dyeing industry; as wetting agents and detergents in the acid washing of fruit, in the acid washing of building stone and brick; as a wetting agent and spreader in the application of asphalt in road building and the like; as a constituent of soldering flux preparations; as a flotation reagent in the flotation separation of various minerals; for flocculation and coagulation of various aqueous suspensions containing negatively charged particles such as sewage, coal washing waste water, and various trade wastes and the like; as germicides, insecticides, emulsifiers for cosmetics, spray oils, water-repellent textile finish, etc. These uses are by no means exhaustive.

However, the most important phase of the present invention, as far as industrial application goes, is concerned with the use of the materials previously described as demulsifiers for water-in-oil emulsions, and more specifically, emulsions of water or brine in crude petroleum.

We have found that the particular chemical compounds or reagents herein described may also be used for other purposes, for instance, as a break inducer in doctor treatment of the kind intended to sweeten gasoline.

Chemical compounds of the kind herein described are also of value as surface tension depressants in the acidization of calcareous oil-bearing strata by means of strong mineral acid, such as hydrochloric acid. Similarly, some members are effective as surface tension depressants or wetting agents in the flooding of exhausted oil-bearing strata.

Compounds of the kind herein described may be used as flooding agents for recovering oil from subterranean strata. Compounds of the kind herein described may be used as demulsifiers, or in particular as surface tension depressants in combination with mineral acid or acidization of oil-bearing strata.

Cognizance must be taken of the fact that the surface of the reacting vessel may increase or decrease reaction rate and degree of polymerization, for instance, an iron reaction vessel speeds up reaction and polymerization, compared with a glass-lined vessel.

It is to be noted that in such instances where the alcoholic body contains a reactive amino hydrogen atom, for instance, in the case where an acylated hydroxylated polyamine is employed, for example, the ricinoleyl acid ester of hydroxyethyl ethylenediamine, the oxyethylated glycerol maleate might react to form an amide of maleic acid. In such instances, of course, such type, to wit, the amido type, is contemplated within the scope of the appended claims in the particular instance, but elaboration is eliminated, because it is unnecessary and would only incur greater length of descriptive matter. Thus, stated in another way, in all appropriate instances, the expression "esterification polymers" in the appended claim, includes amidification polymers, as well as esterification polymers.

Having thus described our invention, what we claim and desire to secure by Letters Patent is:

A member selected from the class consisting of solvent-soluble hydrophile liquid monomeric esters and solvent-soluble hydrophile fusible polymeric esters; said esters being obtained by an esterification reaction between (a) a hydroxylated substituted pyridinium hydrohalide in which the pyridinium radical is selected from the group consisting of pyridinium and its lower hydrocarbon substituted homologues, containing as a substituent for the pyridinium hydrogen atom an aliphatically bound radical, free from heterocyclic radicals, containing at least 8 and not more than 59 carbon atoms and having as an integral part thereof at least one alcoholic hydroxyl radical and (b) an acidic fractional ester obtained by esterification reaction in turn between (a) oxyalkylated glycerol obtained by the action of an alkylene oxide having not over 3 carbon atoms on glycerol so as to introduce at least 3 and not more than 10 ether linkages in each hydroxyl-containing radical, and (b) a polycarboxy acid selected from the class consisting of oxalic, malonic, succinic, glutaric, adipic, maleic, phthalic, fumaric, glutaconic, citric, malic, and tartaric acids.

MELVIN DE GROOTE.
BERNHARD KEISER.

No references cited.